United States Patent
Okagawa et al.

(10) Patent No.: US 7,826,461 B2
(45) Date of Patent: Nov. 2, 2010

(54) PACKET SWITCHING SYSTEM, PACKET SWITCHING METHOD, ROUTING APPARATUS, STRUCTURE OF PACKET, AND PACKET GENERATING METHOD

(75) Inventors: Takatoshi Okagawa, Yokosuka (JP); Yasuhisa Hayashi, Yokohama (JP); Manhee Jo, Yokohama (JP); Takeshi Ihara, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 284 days.

(21) Appl. No.: 11/852,816

(22) Filed: Sep. 10, 2007

(65) Prior Publication Data
US 2008/0013549 A1 Jan. 17, 2008

Related U.S. Application Data

(63) Continuation of application No. 10/331,661, filed on Dec. 31, 2002, now abandoned.

(30) Foreign Application Priority Data

Jan. 10, 2002 (JP) ............................. 2002-003799

(51) Int. Cl.
*H04L 12/28* (2006.01)
*H04L 12/56* (2006.01)
(52) U.S. Cl. ........................................ 370/397
(58) Field of Classification Search .................. 370/238, 370/394, 392, 352, 351, 229, 428, 400, 401, 370/410, 397, 315, 389, 254, 402, 323, 399, 370/395, 221, 216, 255; 725/81; 709/224, 709/221; 375/240
See application file for complete search history.

(56) References Cited

U.S. PATENT DOCUMENTS

| | | | | |
|---|---|---|---|---|
| 4,058,672 A | * | 11/1977 | Crager et al. | 370/394 |
| 4,058,838 A | * | 11/1977 | Crager et al. | 358/425 |
| 5,473,598 A | * | 12/1995 | Takatori et al. | 370/399 |
| 5,499,237 A | * | 3/1996 | Richetta et al. | 370/400 |
| 5,572,512 A | | 11/1996 | Cutler et al. | |
| 5,579,307 A | | 11/1996 | Richetta et al. | |
| 5,627,836 A | * | 5/1997 | Conoscenti et al. | 370/397 |

(Continued)

FOREIGN PATENT DOCUMENTS

JP 2000-83045 3/2000

(Continued)

*Primary Examiner*—Pankaj Kumar
*Assistant Examiner*—Prenell P Jones
(74) *Attorney, Agent, or Firm*—Oblon, Spivak, McClelland, Maier & Neustadt, L.L.P.

(57) ABSTRACT

The packet switching system for transmitting and receiving a packet via a packet switching network 100, which comprises a plurality of routing tables (#0, #1, #2 . . . ), each of which has been generated by a unique routing policy, stored in the routing apparatuses deployed at the border, at the origin or at the end of the respective routing domains, an identifier (RTI) inserted in the packet to specify the routing tables, and an identifier changer to change a value of the identifier on the packet switching network 100. The routing apparatus selects one of the routing tables (#0, #1, #2 . . . ) according to the RTI in the received packet and transfers the packet to a destination that is specified by the selected routing table.

12 Claims, 6 Drawing Sheets

U.S. PATENT DOCUMENTS

| | | | |
|---|---|---|---|
| 5,708,961 A * | 1/1998 | Hylton et al. | 725/81 |
| 6,243,387 B1 * | 6/2001 | Hjalmtysson et al. | 370/410 |
| 6,341,127 B1 * | 1/2002 | Katsube et al. | 370/352 |
| 6,567,380 B1 * | 5/2003 | Chen | 370/238 |
| 6,600,583 B1 | 7/2003 | Fatehi et al. | |
| 6,976,087 B1 | 12/2005 | Westfall et al. | |
| 7,012,890 B2 * | 3/2006 | Yazaki et al. | 370/229 |
| 7,315,541 B1 * | 1/2008 | Housel et al. | 370/392 |
| 2001/0042215 A1 * | 11/2001 | Sullivan et al. | 713/201 |
| 2003/0189930 A1 * | 10/2003 | Terrell et al. | 370/389 |
| 2003/0189936 A1 * | 10/2003 | Terrell et al. | 370/395.31 |
| 2004/0131013 A1 | 7/2004 | Ise et al. | |
| 2006/0114924 A1 * | 6/2006 | Yazaki et al. | 370/428 |
| 2007/0091893 A1 * | 4/2007 | Yazaki et al. | 370/392 |

FOREIGN PATENT DOCUMENTS

| | | |
|---|---|---|
| JP | 2001-217870 | 8/2001 |
| JP | 2001-285351 | 10/2001 |
| JP | 2001-333091 | 11/2001 |
| JP | 2003-8623 | 1/2003 |
| JP | 2003-18198 | 1/2003 |
| JP | 2003-78555 | 3/2003 |
| JP | 2004-507917 | 3/2004 |
| WO | WO 01/63838 A2 | 8/2001 |

* cited by examiner

FIG. 6

| Routing Table ID | Routing Policy ID (Routing Protocol or Control Message) | RTI (Routing Table Identifier) |
|---|---|---|
| Routing Table #0 | RIP | RTI=X0 |
| Routing Table #1 | OSPF | RTI=X1 |
| Routing Table #2 | Host Address Routing | RTI=X2 |
| Routing Table #3 | FUNCTIONAL TRANSFER ROUTING | RTI=X3 |
| ------ | ------ | ------ |

T1

PACKET SWITCHING SYSTEM, PACKET SWITCHING METHOD, ROUTING APPARATUS, STRUCTURE OF PACKET, AND PACKET GENERATING METHOD

CROSS REFERENCE TO RELATED APPLICATIONS

This application is a continuation of application Ser. No. 10/331,661, filed Dec. 31, 2002, and claims the benefit of priority from the prior Japanese Patent Application No. P2002-003799, filed on Jan. 10, 2002. The entire contents of which are incorporated herein by reference.

BACKGROUND OF THE INVENTION

1. Field of the Invention

The present invention relates to a packet switching system, a packet switching method, a routing apparatus, a structure of packet, and packet generating method, which are configured to transfer packets via a packet switching network that is configured by interconnecting a plurality of routing apparatuses.

2. Description of the Related Art

In the conventional packet switching network, such as the Internet for example, IP address is assigned to each host (terminal) so that a physical location of the host can be identified. Then a routing apparatus (hereinafter referred to as router) on the network performs forwarding of packets to a destination host, which is called "routing", according to a routing table that shows a relationship between destination IP address and a next hop router.

Normally, various dynamic routing protocols, e.g., RIP, OSPF, are utilized in the router to generate routing tables. Respective routing protocols generate and update a routing table in the router based on the prescribed algorithm and the major difference between these routing protocols is how to handle the routing table, i.e., a routing policy.

FIG. 1 shows an internal configuration of a conventional router. As shown in FIG. 1, a conventional router 110 is configured with an input interface 111, a packet forwarder 112, an output interface 113, a routing protocol processor 116 and a routing table 106a. The input interface 111 has a packet receiver 114, a routing table searcher 115 and a routing table cache 106.

In the conventional router 110, when the packet receiver 114 receives a packet, a packet destined for the conventional router 110 itself is transferred to the routing protocol processor 116, and a packet destined for a router other than the conventional router 110 is transferred to the routing table searcher 115. The routing protocol processor 116 updates the routing table 106a according to the received packet destined for the conventional router 110 itself and stores the updated routing table in the routing table cache 106. The routing table searcher 115 decides on an output interface by searching the routing table cache 106 for the received packet destined for other than the conventional router 110. The received packet destined for a router other than the conventional router 110 is then forwarded to a packet transmitter 117 of the output interface 113 via the packet forwarder 112, and finally forwarded to external devices by the packet transmitter 117.

As described above, although the conventional router 110 can store the plural routing tables by supporting the plural routing protocols, the routing table searcher 115 can select only one routing table, which is generated by a unique routing policy, from the plural routing tables stored in the conventional router 110. Therefore, in the conventional router 110, routing of input traffic can only be performed according to a single routing policy.

FIG. 2 shows how the routing tables are handled in the conventional router 110. As shown in FIG. 2, the conventional router 110 can support various routing protocols, for example, BGP107, OSPF108, RIP109, and generates routing tables 102a, 103a, 104a based on an algorithm of each routing protocol. The routing tables 102a, 103a, 104a can be stored into a routing cache 102, 103 and 104 in the conventional router 110, respectively. A static routing table 105 that shows default routes can also be stored into a routing cache 105a.

However, manual intervention is required to select one routing table from the routing tables 102a, 103a, 104a so that the routing table cache 106 which stores a selected routing table can recognize a routing table to be utilized. In addition, conventional router 110 may select an appropriate routing table according to a priority which is manually given to respective routing tables and the routing table is selected according to the priority and loaded into the routing table cache 106 as the routing table 106a. As a result, only a single routing table can be utilized for routing in one timeframe and it is of concern that a routing policy utilized for the packet switching network is limited to a single routing policy.

Accordingly, since the single routing policy has to be selected even the optimum routing policy differs from area to area on the packet switching network. It is therefore a problem that the switching of a routing policy dynamically, for example, per packet or per flow cannot be achieved.

In the existing TCP/IP network, a structure of an IP address results in routing based on a physical address of a client terminal and a server, and a routing algorithm is fixed by the routing algorithm utilized by RIP or OSPF, etc. It is not therefore feasible on the network to route a specific packet via a specific path in order to achieve a certain purpose.

Moreover, since routing is performed based on a single routing policy in the conventional art, the simultaneous use of more than one route for the same destination IP address and routing to a specific device on the network per packet, per flow or per block of traffic without the knowledge of such routing process of the client terminal is not feasible. Further, the network has no right to dynamically change the routing of a packet according to a certain signal.

As described above, since only a single routing table is utilized for the actual transfer of a packet, a routing policy is decided automatically in the router that configures a conventional TCP/IP network even if the router (an interface of the router) supports plural routing protocols.

However, there is demand to change a routing policy dynamically per packet, per flow or per input interface and to apply different routing policies per routing domain in the case where the network is formed by an aggregation of routing domains.

BRIEF SUMMARY OF THE INVENTION

The present invention has been made in view of the above problems, and thus has an object of providing a packet switching system, packet switching method and a router which enable flexible and highly functional routing by the simultaneous use of plural routing policies in a packet switching network that is configured by interconnecting a plurality of routers.

To achieve the object, it is preferred that in the present invention, the packet switching network is configured by interconnecting a plurality of routing domains formed in a prescribed area, a plurality of the routing tables, which have each been generated by a unique routing policy, are utilized in each of the routing domains, the router is deployed at a border with an adjacent routing domain, the origin or the end of the routing domain, and the router changes the value of the identifier in view of a routing policy utilized in the routing domain to which the packet is to be transferred.

In the present invention, it is preferred that the same process is performed to change the value of the identifier for a prescribed block of packets in accordance with a type of the packet. Here, change the value of the identifier for the prescribed block of packets means the process to change the value of the identifier per flow of packet, regarding input interface, or regarding all the traffic. In other words, the prescribed block of packets is a unit determined based on various conditions in the packet (e.g., port number, TOS field and source address).

In the present invention, it is preferred to instruct an applicable router to change the value of the identifier in accordance with variation in a status of communication by monitoring the status on the packet switching network. Incidentally, monitoring a status of communication on the packet switching network may be performed by a controlling apparatus which is independent from the router, or may be performed in the router.

Here, the routing policy means a design policy for generating the routing table that is used to control routing. Examples of the routing policy include "Distance vector routing control", "Link state routing control", "Host address routing control", "Load balancing routing control", "Functional transfer routing control", and so on.

The "Distance vector routing control" is a policy to perform packet transfer via a route that has the smallest number of physical hops to a destination. The "Distance vector routing control" simplifies the configuration of a network and thus flattens a network hierarchy.

The "Link state routing control" selects a route depending on the metrics of cost calculated based on a type of interface, bandwidth, etc and it utilizes an available bandwidth, propagation delay, number of hops, etc. as parameters for calculating the metrics. The "Link state routing control" is able to build a hierarchal network (i.e., backbone and area) as well as a large-scale network.

The "Host address routing control" decides on an output interface (next hop) according to a destination address which has no dependency on a network topology so as to secure the mobility of the client terminal.

The "Load balancing routing control" enables the simultaneous use of more than one route for the same IP address and the dynamic change of a route depends on traffic volume.

The "Functional transfer routing control" is a controlling method for transferring a packet to a specific router without changing a destination address if a certain signal is received.

It is to be noted that "change of an identifier" in the present invention includes addition, update and deletion of the identifier.

According to the present invention, the selection of the plural routing protocols dynamically on the network, for example, per packet, per IP address, per flow of packet, per packet according to information contained in the TOS field or the Flow-Label of IPv6, per input interface and regarding all the traffic, are feasible, and highly functional traffic control as well as routing control is achieved on the network accordingly.

In addition, the present invention avoids the situation in a conventional system that a routing policy to be used on the network or in the router is decided automatically. Therefore, as the plural routing policies can be selected dynamically by changing the identifier, it allows the performance of optimum routing for certain areas on the network. Further, routing a packet to a specific router without the knowledge of routing process of the client terminal is also achieved and it enables flexible as well as highly functional routing.

BRIEF DESCRIPTION OF THE SEVERAL VIEWS OF THE DRAWINGS

FIG. 6 is a schematic diagram explaining a routing policy table according to the embodiment of the invention.

DETAILED DESCRIPTION OF THE INVENTION

Figure 1:
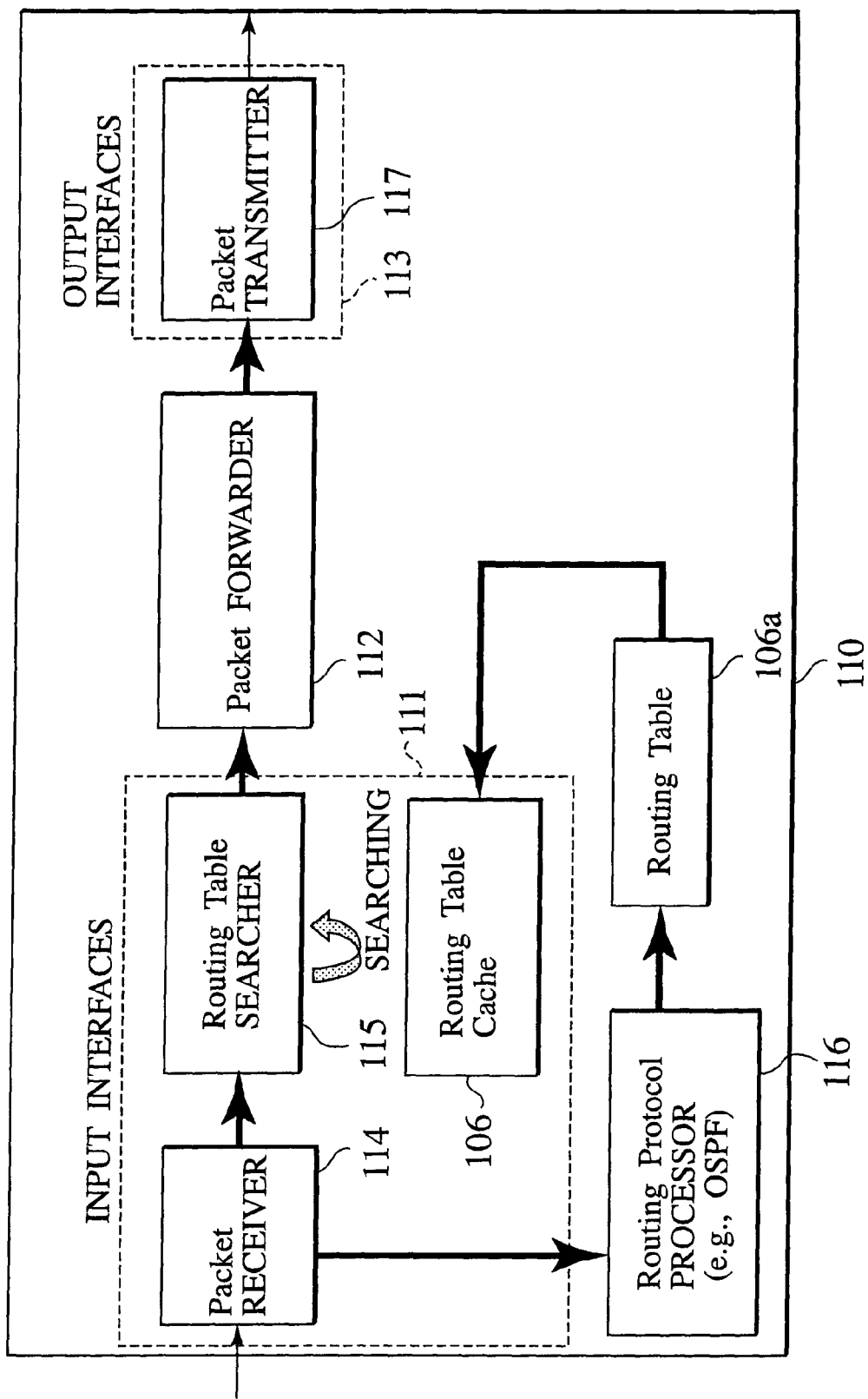
FIG. 1 is a block diagram showing an internal configuration of a router of a conventional system.
Figure 2:
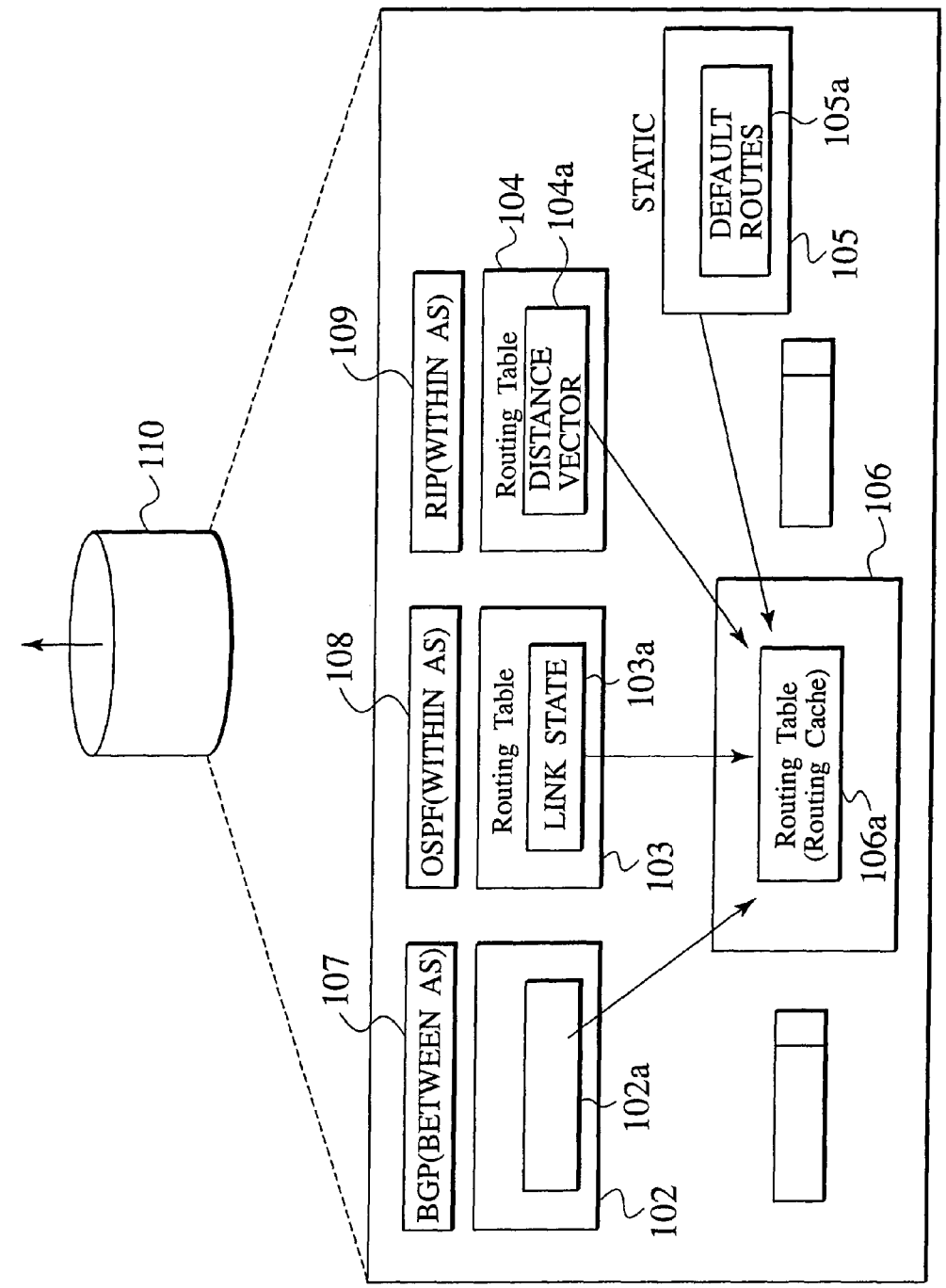
FIG. 2 is a block diagram showing a process in the router of the conventional system.
Figure 3:
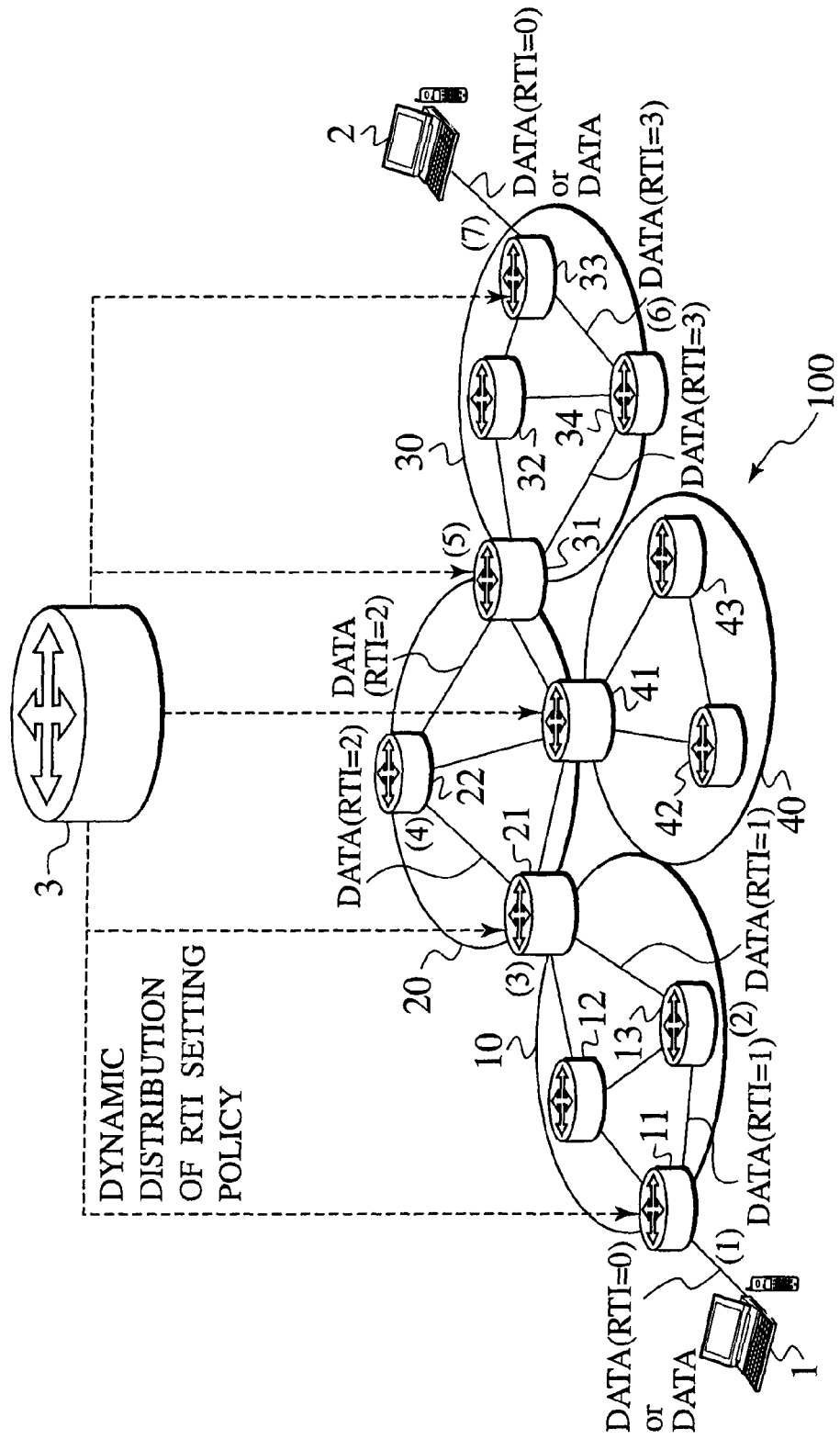
FIG. 3 is a schematic diagram showing the overall configuration of a packet switching system according to an embodiment of the invention.

An embodiment of a packet switching system according to the invention is described with reference to associated drawings. FIG. 3 schematically describes the overall configuration of the packet switching system according to the embodiment of the invention. Here, a routing of a packet from a client terminal 1 to a destination client terminal 2 via a route (1) through (7) on a packet switching network 100 will be described as a typical example.

As shown in FIG. 3, the packet switching network 100 is configured by interconnecting routing domains 10, 20, 30 and 40. Each routing domain is configured by routers. In FIG. 3, the routing domain 10 is configured by routers 11 through 13, the routing domain 20 is configured by routers 21 and 22, the routing domain 30 is configured by routers 31 through 34, and the routing domain 40 is configured by routers 41 through 43, respectively. The routing domains are interconnected via border routers 21, 31 and 41. A network management apparatus 3 manages network elements, e.g., routers, on the packet switching network 100.

In this embodiment, a packet transferred on the packet switching network 100 has an identifier (routing table identifier, hereinafter referred to as RTI) for selecting an appropriate routing table from the plural routing tables (#0, #1, #2 . . . ) that are stored in the routers (11-13, 21, 22, 31-34, 41-43). The RTI is inserted in the packet and a value of the RTI can be changed within the packet switching network 100 according to the routing policy utilized in the routing domain to which the packet is to be transferred. Further, as the status of traffic on the packet switching network 100 varies, the value of RTI can be changed. In this embodiment, the RTI is inserted in the packet header field, e.g., a Flow-Label field in a header of IPv6 and the other field in the header. The RTI may be inserted at the border router on the packet switching network 100.

The value of RTI is changed for a unit according to the prescribed number of packets, e.g., flow of packets, input interface, all the incoming traffic and specific information contained in the packet. The "specific information" means, for example, a port number, TOS field, a source address and so on.

The client terminal 1 is connected to the routing domain 10 via an edge router 11. The destination client terminal 2 is connected to the routing domain 30 via an edge router 33.

Figure 4:
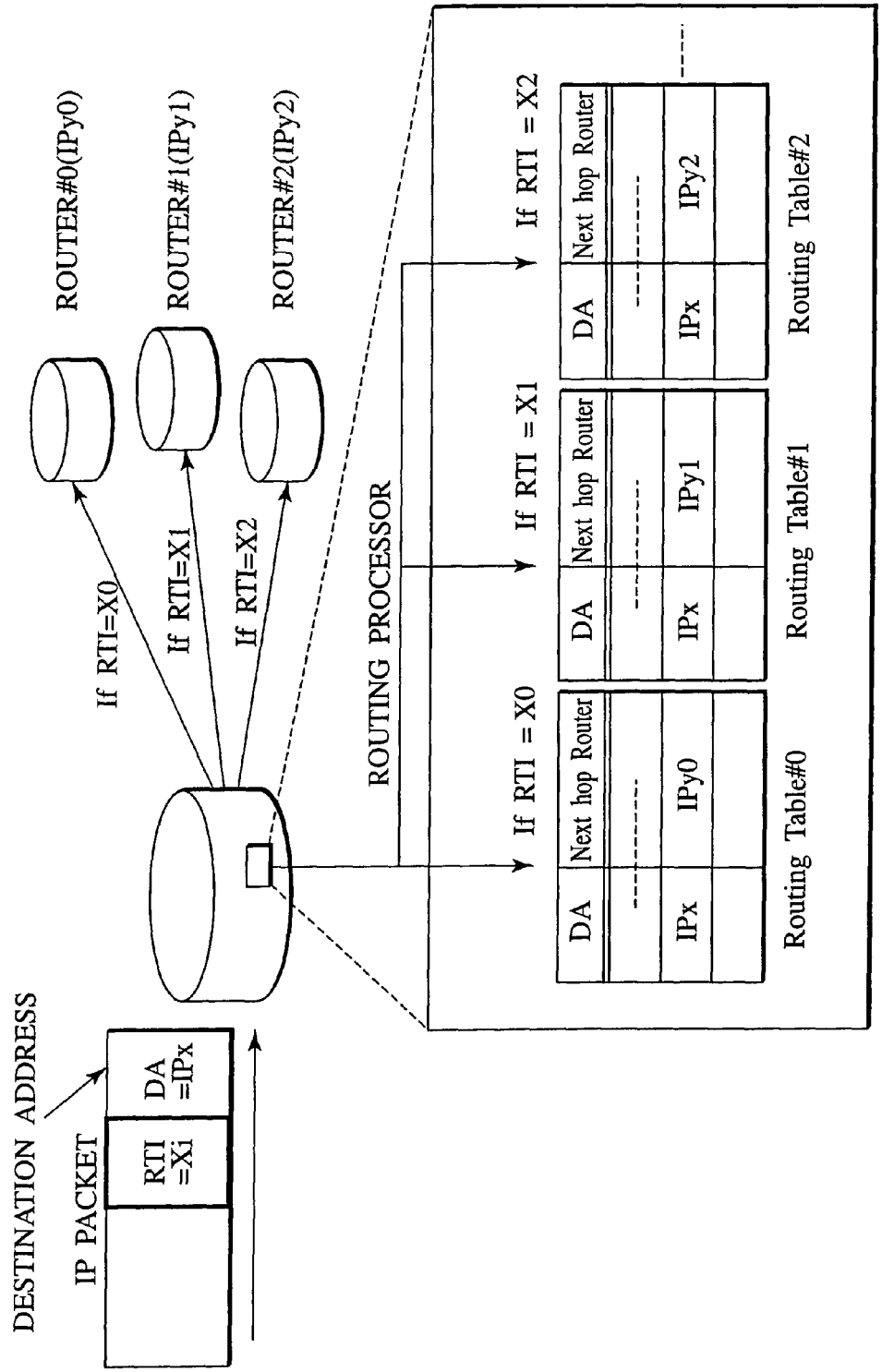
FIG. 4 is a schematic diagram explaining a routing table stored in a router according to the embodiment of the invention.

As shown in FIG. 4, routers 11 through 13, 21, 22, 31 through 34, and 41 through 43 have the plural routing tables (#0, #1, #2 . . . ), respectively, and the router selects one routing table from these tables according to the value of the RTI. The router then decides on a router to which the packet is to be transferred by referring to a destination address indicated on the selected routing table so as to transfer packets continuously.

The routing tables (#0, #1, #2 . . . ) are generated based on respective routing policies and one of the routing tables is specified by the value of RTI, which is called a routing table ID (RTI: Xi). The routing tables are utilized to search an address of a next hop router (IPy0-IPy2) that corresponds with a destination address (IPx).

In this embodiment, the routing tables (#0, #1, #2 . . . ) contain a network prefix of a destination IP address as well as an IP address of the next hop router, and are generated by RIP or OSPF routing protocol and so on. It is also accepted that the routing table utilized in this embodiment specifies the IP address of the next hop router for all the destination IP addresses, and the routing table is generated by a newly created routing algorithm. Further, the routing table can be configured and the IP address of next hop router can be set taking various information into account, e.g., value of TOS field, port number and Flow-Label of IPv6 header, which are contained in the packet including a packet header, additional information in the router, e.g., the number of packets per input interface, the status of network resources and all the incoming packets at the router.

Figure 5:
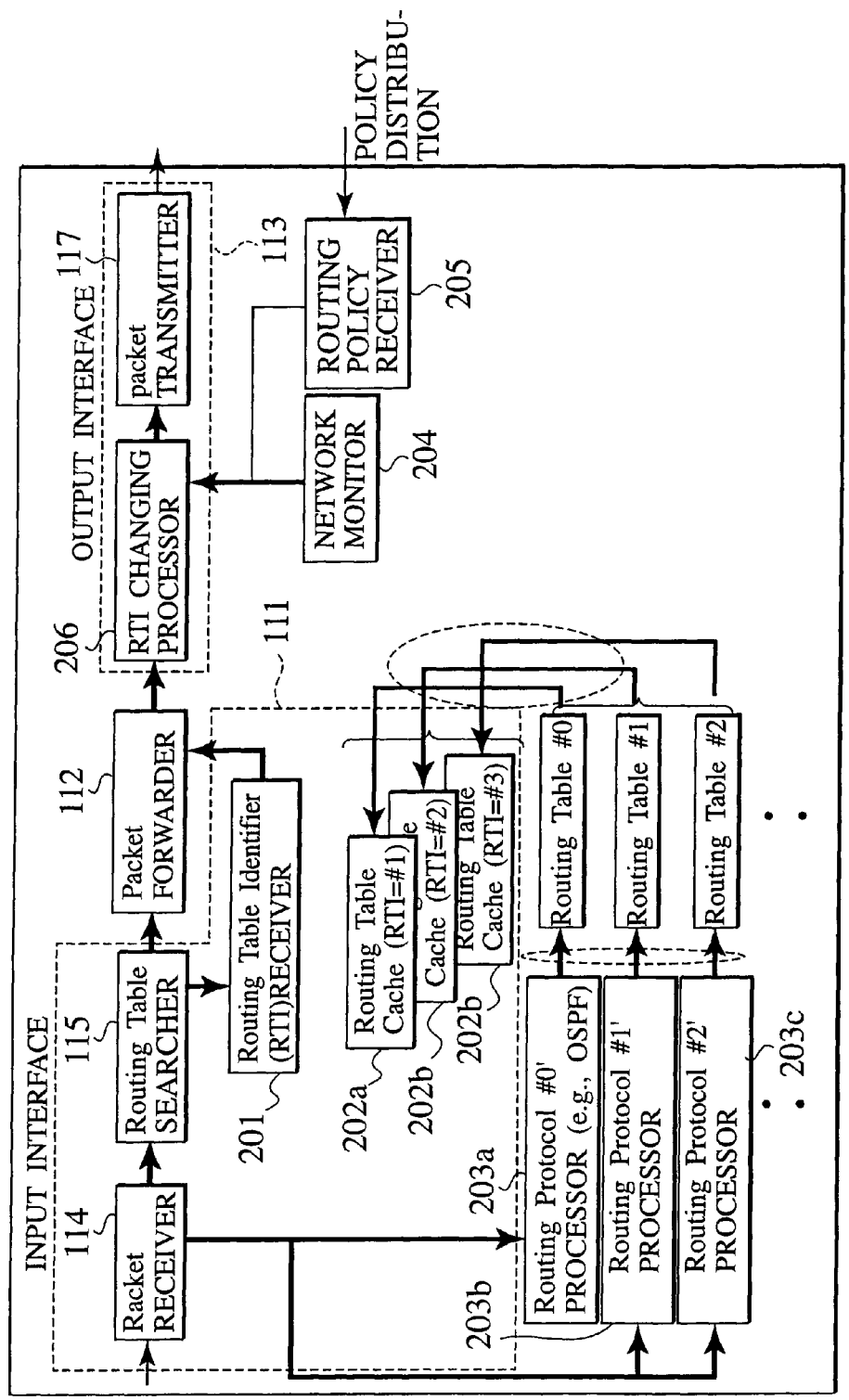
FIG. 5 is a block diagram showing an internal configuration of the router according to the embodiment of the invention.

In this embodiment, the border router 21, 31, 41 as well as the edge router 11, 33 have a function of adding and changing the ID of the RTI that is inserted in the packet. FIG. 5 is a block diagram showing an internal configuration of the border router that has a function of adding and changing the ID of the RTI.

As shown in FIG. 5, the border router is configured with an input interface 111, a packet forwarder 112, an output interface 113, a routing protocol processor 203a/203b/203c, a network monitor 204, and a routing policy receiver 205.

The input interface 111 has a packet receiver 114 for receiving the packet, a routing table searcher 115 for searching for a routing table, a RTI receiver 201 for receiving the RTI, and a routing table cache 202a/202b/202c for storing the routing table.

The packet forwarder 112 decides on an address of the next hop router, which the packet to be transferred, based on a routing table searched by the routing table searcher 115, and then sends an instruction to the output interface 113 to transfer the packet to the address.

The routing protocol processor 203a/203b/203c updates the routing table (#0, #1, #2 . . . ) according to a routing protocol (#0', #1', #2' . . . ) which is selected based on the value of the RTI informed by the RTI receiver 201. The updated routing tables (#0, #1, #2 . . . ) are stored in the routing table cache 202a/202b/202c, respectively.

The output interface 113 has a packet transmitter 117 and a RTI changing processor 206. The packet transmitter 117 transmits the packet according to an instruction sent by the packet forwarder 112.

The RTI changing processor 206 changes the ID (value) of the RTI in the packet to be transferred according to an instruction from the network monitor 204 and the routing policy receiver 205.

The ID of the RTI is properly decided taking into account the static status of the edge routers as well as the border routers (e.g., the situation of traffic, priority of the routing policies, IP address of the packet to be transferred, port number, type of an application contained in the packet and so on) and an instruction is dynamically sent by the network management apparatus 3.

Further, if the conventional router, which has no function of adding/changing/deleting of the RTI or has no capability of storing the plural routing tables, exists on the network, the routers in this embodiment ignore the ID of the RTI (or it is handled as "0", which is the default value), and perform routing by a routing table generated by RIP, OSPF, etc. This maintains connectivity to the conventional packet switching network.

The network monitor 204 measures the existing priority of the routing policies in the routing domain, the status of traffic on the network, the usage of network resources, throughput and supported routing protocols, in order to analyze the load on the network, and determines the priority of routing policies accordingly.

The routing policy receiver 205 is connected to the other apparatuses, e.g., the network management apparatus 3 and sends a changing instruction to the RTI changing processor 206 based on a request from the other apparatuses. The request from the other apparatuses means a signal informed by a network management layer including the network management apparatus 3 (e.g., an instruction by a specific address, input interface, port number, Flow-Label of IPv6 or value of TOS field), negotiation with the other routers and so on.

The RTI changing processor 206 has a routing policy table T1 and performs a process of changing the ID of the RTI when it receives the changing instruction from the network monitor 204 or the routing policy receiver 205. FIG. 6 illustrates the content of the routing policy table T1 in this embodiment.

The routing policy table T1 indicates a relationship between the RTI, the routing policy and the routing table in order to discriminate which routing table is generated by which routing policy, i.e., the routing protocol. Specifically, as shown in FIG. 6, the routing policy table T1 is configured with a routing table ID, a routing policy ID and the RTI. The routing policy table T1 may include additional information other than these IDs.

The routing table ID is an identifier specifying routing tables that is stored in the border router, the edge router and the client terminal, etc.

The routing policy ID is an identifier specifying the routing protocol as well as the various controlling protocols so as to generate the routing tables, or for specifying the static status based on a certain routing policy.

The RTI is inserted in the packet, and is an identifier for specifying a routing table to be referred. In this embodiment, the same number is utilized between the routing table ID and the RTI for specifying the routing table.

Incidentally, the routing policy table T1 may commonly be utilized among all the routers on the packet switching network. It is not necessary to utilize the same routing policy table T1 commonly on the packet switching network if a certain routing domain cannot support the specific routing protocol, and a different routing policy table may also be utilized within the respective routing domains.

On the packet switching network 100 which has the above described functions, the edge router 11 first recognizes the RTI and the destination address (DA) of the received packet when the packet is transmitted from the client terminal 1 to the destination client terminal 2 (refer to (1) in FIG. 3). The edge router 11 then specifies a routing policy to be utilized in the routing domain 10 based on the recognized RTI and the DA. At this point in time, the edge router 11 inserts the RTI in the packet according to the default routing policy utilized in the routing domain 10 if the RTI is not inserted in the packet or value of the RTI is "0" ("1" is inserted as the value of RTI in FIG. 3).

Further, the edge router 11 forwards the packet to the next hop router (the router 13 in FIG. 3) by referring to the routing table, by which the specified routing policy has been generated.

The router 13 in the routing domain 10 similarly selects the routing table by referring the RTI of received packet (refer to (2) in FIG. 3) and transfers the packet to the next hop router (the border router 21 in the FIG. 3).

The border router 21 decides on a routing policy to be utilized in the routing domain 20 based on the RTI of the received packet, and if the routing policy in the routing domain 20 differs from the routing domain 10, the border router 21 changes the value of the RTI (refer to (3) in FIG. 3). The border router 21 then transfers the packet to the next hop router (the router 22 in FIG. 3).

On the packet switching network 100, the above described process is performed repeatedly and the packet is transferred via routes (4) through (7) shown in FIG. 3. In this embodiment, the edge router 33 may delete the RTI when the packet is transferred to the destination client terminal 2.

As will be seen from the foregoing description, flexible and highly functional routing is achieved by the simultaneous use of the plural routing policies on the packet switching network. In other words, according to the invention, routing a specific packet to a specific router on the network when the routers receive a certain signal without the knowledge of such routing process of the client terminal, the dynamic use of the plural routing policies, the simultaneous use of more than one route for the same IP address, etc. are achieved and thus a routing control can be highly fictionalized.

Moreover, various applications are feasible by using the invention and the invention is able to cover all the routing control systems to which the invention is applied.

The invention has been described in detail by referring to the embodiments. It is obvious to those skilled in art that the invention is not restricted to the embodiments mentioned above. The invention may be carried out as a corrected or modified embodiment not departing from the gist and scope specified by the scope of the claims of a patent. Therefore, the description of this specification aims at the representation of examples but does not have any limitation on the present invention.

What is claimed is:

1. A packet switching system for transmitting and receiving a packet via a packet switching network that is configured by interconnecting a plurality of routing apparatuses, comprising:
   a routing table storage unit provided in each of the plurality of routing apparatuses, and configured to store a plurality of routing tables, each of the routing tables being generated by a unique routing policy;
   an identifier inserted in the packet, configured to specify one of the routing tables; and
   an identifier changer configured to change a value of the identifier within the packet switching network, wherein
   the routing apparatuses are configured to select a routing table from the plurality of routing tables in accordance with the value of the identifier inserted in the packet received, and to transfer the packet to a destination that is specified by the selected routing table,
   the packet switching network is interconnected by a plurality of routing domains formed in a prescribed area, the plurality of routing tables are utilized in each of the routing domains, the routing apparatus is deployed at a border with an adjacent routing domain, at the origin or at the end of the routing domain, and
   the identifier changer is further configured to change the value of the identifier in view of a routing policy utilized in the routing domain to which the packet is to be transferred, and to perform the same process to change the value of the identifier for a prescribed block of the packets in accordance with a type of packet.

2. A packet switching system according to claim 1, further comprising, a monitor configured to monitor a status of communication on the packet switching network, and to instruct the identifier changer to change the value of the identifier in accordance with variation in a status of communication.

3. A packet switching system according to claim 2, wherein the monitor is implemented independently from the routing apparatus.

4. A packet switching system according to claim 2, wherein the monitor is implemented in the routing apparatus.

5. A packet switching method for transmitting and receiving a packet via a packet switching network that is configured by interconnecting a plurality of routing apparatuses comprising the steps of:
   storing a plurality of routing tables, each of which has been generated by a unique routing policy, in the routing apparatuses;
   inserting an identifier in the packet to specify a routing table;
   reading the identifier from the packet by one of the routing apparatuses to select the routing table specified by the identifier;
   transferring the packet to a destination that is specified by the routing table selected; and
   changing the value of the identifier within the packet switching network, wherein
   the packet switching network is interconnected by a plurality of routing domains formed in a prescribed area, the plurality of routing tables are utilized in each of the routing domains, the routing apparatus is deployed at a border with an adjacent routing domain, at the origin or at the end of the routing domain, and
   said step of changing the value of the identifier is further changed in view of a routing policy utilized in the routing domain to which the packet is to be transferred and performs a same process to change the value of the identifier for a prescribed block of the packets in accordance with a type of packet.

6. A packet switching method according to claim 5, further comprising the step of:
   instructing an applicable routing apparatus to change the value of the identifier in accordance with variation in a status of communication by monitoring the status of the packet switching network.

7. A packet switching method according to claim 6, wherein said step of instructing is performed at a controlling apparatus which is independent from the routing apparatus.

8. A packet switching method according to claim 6, wherein said step of instructing is performed in the routing apparatus.

9. A routing apparatus for configuring a packet switching network for transmitting and receiving a packet comprising:
   a storing unit configured to store a plurality of routing tables, each of which has been generated by a unique routing policy;

a routing table searcher configured to select a routing table from the plurality of routing tables in accordance with a value of an identifier inserted in the packet for specifying a routing table;

a transferor configured to transfer the packet to a destination that is specified by the selected routing table; and a identifier changer configured to change the value of the identifier, wherein the packet switching network is interconnected by a plurality of routing domains formed in a prescribed area, the plurality of routing tables are utilized in each of the routing domains, the routing apparatus is deployed at a border with an adjacent routing domain, at the origin or at the end of the routing domain, and the identifier changer is further configured to change the value of the identifier in view of a routing policy utilized in the routing domain to which the packet is to be transferred, and to perform the same process to change the value of the identifier for a prescribed block of the packets in accordance with a type of packet.

10. A routing apparatus according to claim 9, further comprising:

a monitor configured to monitor the status of communication on the packet switching network, and to instruct the identifier changer to change the value of the identifier in accordance with variation in a status of communication.

11. A packet generating method for generating a packet that is transmitted and received on a packet switching network configured by interconnecting a plurality of routing apparatuses comprising the steps of:

storing a plurality of routing tables, each of which has been generated by a unique routing policy, in the routing apparatuses;

inserting an identifier that identifies a routing table from the plurality of routing tables, the identifier changeable by the packet switching network, in the received packet to specify one of the plurality of routing tables; and changing a value of the identifier of the received packet based on a routing policy utilized in a routing domain to which the packet is to be transferred, wherein the packet switching network is interconnected by a plurality of routing domains formed in a prescribed area, the plurality of routing tables are utilized in each of the routing domains, the routing apparatus is deployed at a border with an adjacent routing domain, at the origin or at the end of the routing domain, and said step of changing the value of the identifier is further changed in view of a routing policy utilized in the routing domain to which the packet is to be transferred and performs a same process to change the value of the identifier for a prescribed block of the packets in accordance with a type of packet.

12. A packet generating method according to claim 11, wherein the value of the identifier is able to be changed in accordance with variation in a status of communication by monitoring the status of the packet switching network.

* * * * *